United States Patent
Basta

(10) Patent No.: US 9,953,016 B2
(45) Date of Patent: Apr. 24, 2018

(54) COMPOSITION AND DECLARATION OF SPRITED IMAGES IN A WEB PAGE STYLE SHEET

(71) Applicant: Box, Inc., Los Altos, CA (US)

(72) Inventor: Matthew A. Basta, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 338 days.

(21) Appl. No.: 14/698,804

(22) Filed: Apr. 28, 2015

(65) Prior Publication Data

US 2016/0321234 A1 Nov. 3, 2016

(51) Int. Cl.
| | |
|---|---|
| *G06F 17/00* | (2006.01) |
| *G06F 17/22* | (2006.01) |
| *G06F 17/30* | (2006.01) |
| *H04L 29/08* | (2006.01) |
| *G06Q 10/10* | (2012.01) |
| *G06F 17/21* | (2006.01) |

(52) U.S. Cl.
CPC ........ *G06F 17/2247* (2013.01); *G06F 17/227* (2013.01); *G06F 17/211* (2013.01); *G06F 17/30* (2013.01); *G06F 17/3089* (2013.01); *G06F 17/30905* (2013.01); *G06Q 10/10* (2013.01); *H04L 67/22* (2013.01)

(58) Field of Classification Search
CPC ........... G06F 17/2247; G06F 17/30905; G06F 17/3089; G06F 17/211; G06F 17/227; G06F 17/30; G06Q 10/10; H04L 67/22
See application file for complete search history.

(56) References Cited

U.S. PATENT DOCUMENTS

| | | | |
|---|---|---|---|
| 2014/0108963 A1* | 4/2014 | Black | G06F 3/04845 715/753 |
| 2015/0012817 A1* | 1/2015 | Redenbach | G06F 17/2247 715/235 |
| 2015/0220496 A1* | 8/2015 | Vink | G06F 9/4443 715/235 |

OTHER PUBLICATIONS

Aslansky. Aslansky/Css-Sprite. GitHub, May 13, 2015, github.comfaslansicy/css-sprite. Accessed Apr. 28, 2015.
Selaux. Selaux/Node-Sprite-Generator. GitHub, Mar. 2, 2017, github.com/selaux/node-sprite-generator. Accessed Apr. 28, 2015.
"Sprite Images", Google Developers, Apr. 8, 2015, developers.google.com/speed/pagespeed/module/filter-image-sprite, Accessed Apr. 28, 2015.

* cited by examiner

*Primary Examiner* — Quoc A Tran
(74) *Attorney, Agent, or Firm* — Vista IP Law Group, LLP

(57) ABSTRACT

A method, computer program product, and system for composition and declaration of tiled images in a style sheet. Embodiments commence upon identifying a collection of one or more computer-readable instances of individual style sheets, and identifying a corresponding collection of computer-readable objects comprising input images, wherein an individual style sheet includes references to the input images. The collection of one or more computer-readable instances of individual style sheets are used to determine a set of referenced images, which set of images are assembled into a tiled image. References to the images found in the set of images are modified or replaced such that the statements in the style sheets reference the tiled image rather than individual input images. One or more modified style sheets are output to be used in lieu of the unmodified style sheets.

21 Claims, 13 Drawing Sheets

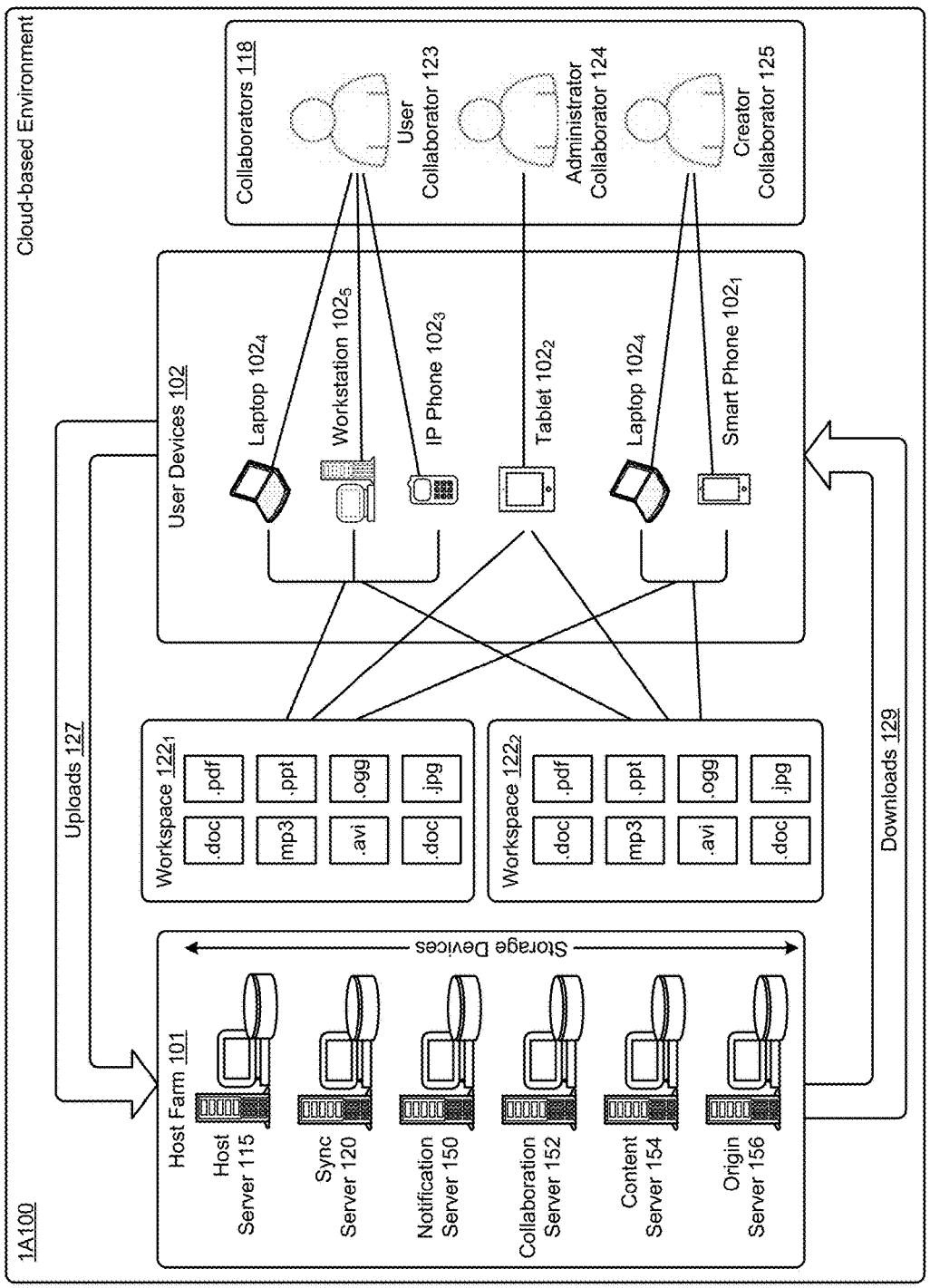
FIG. 1A1

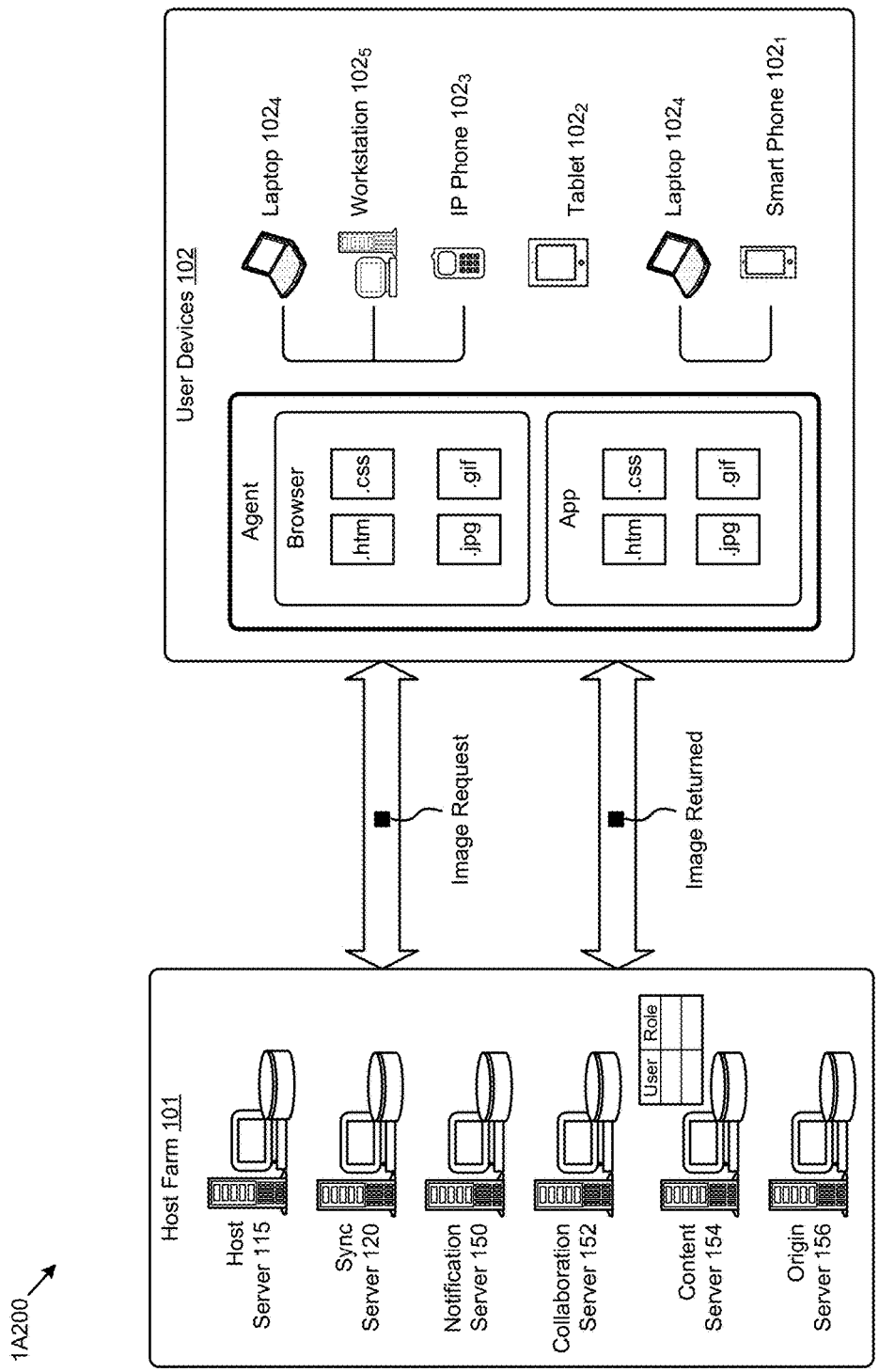
FIG. 1A2

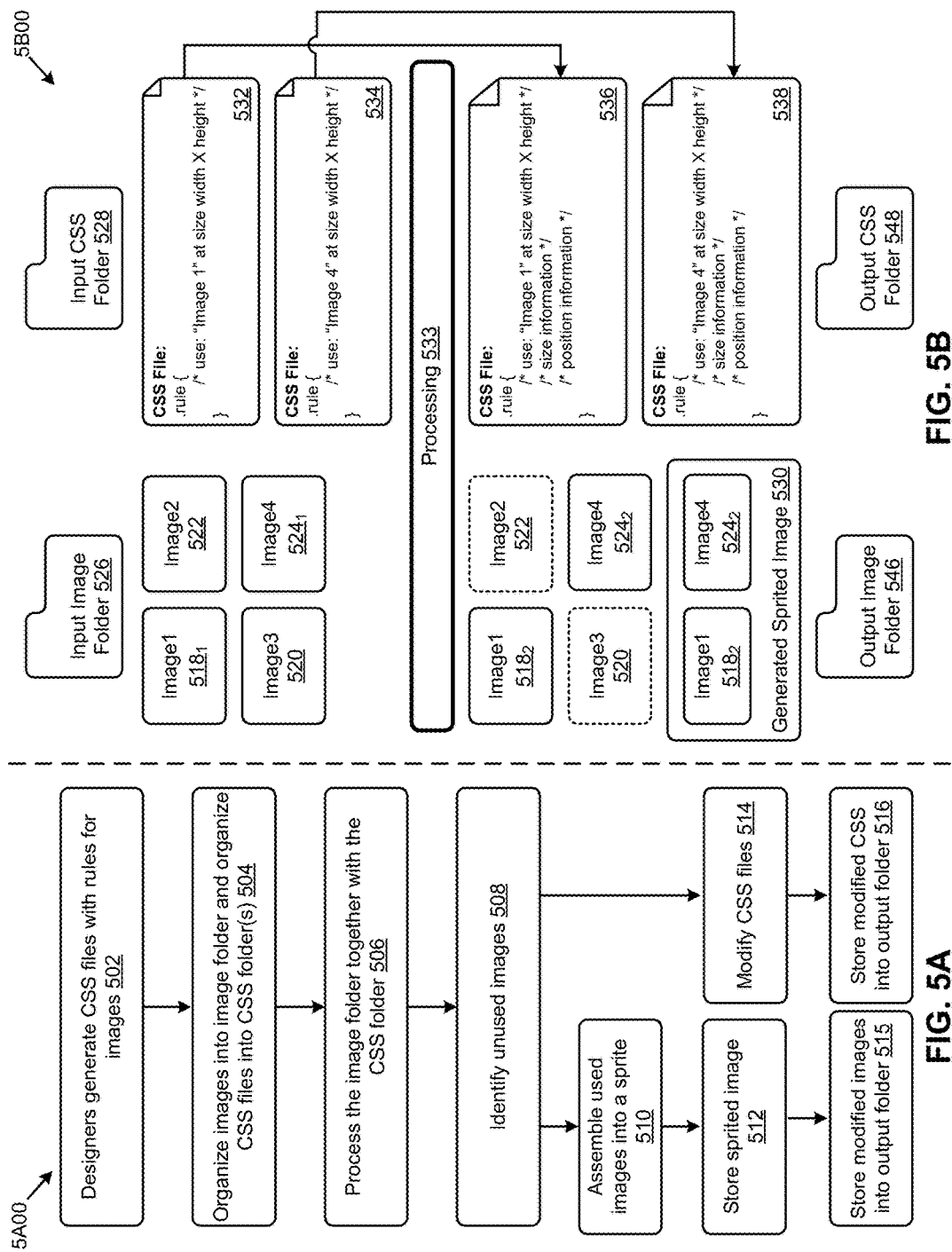

Original CSS File:
.notification-type-warn .close-btn {
  sprite: "notifications/close_black.png" dest-size(16px 16px);
}

Rewritten CSS File:
.notification-type-warn .close-btn {
  sprite: "notifications/close_black.png" dest-size(16px 16px);
  /* re-coded portion */;
  background: url(./..//img/sprite.compat.png) -208px -331px; ← Statement 602
  background: url(./..//img/sprite.png) -185.142px -1618.285px/349.714px 1755.428px; ← Statement 604
  /* end re-coded portion*/
  /* re-coded portion */; ← Statement 610
  ... ← Statement 612
  /* end re-coded portion*/
}

First Recoded Portion 606

Second Recoded Portion 608

COMPOSITION AND DECLARATION OF SPRITED IMAGES IN A WEB PAGE STYLE SHEET

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of computer graphics in a client-server setting, and more particularly to techniques for composition and declaration of sprited images in a web page style sheet.

BACKGROUND

In the field of computer graphics, especially as pertaining to dealing with computer graphics in an Internet setting or client-server setting, the representation of graphics (e.g., references to files or other objects containing the computer graphics) can take on many forms. For example, in one legacy form each image used in a page (e.g., a web page) can be individually referenced, and individually retrieved, and individually rendered on to the page. In situations where many images are used in a composited page, the access overhead pertaining to individual accesses for individual graphics for the page can become much larger than the accessed images themselves. Especially in a web or other client-server setting, such individual accesses can result in poor use of bandwidth, and can introduce latency that is observable by the user.

Some legacy techniques have attempted to ameliorate the aforementioned undesirable effects (e.g., poor use of bandwidth, rendering latency, etc.) by combining or grouping sets of images into a single image. In cases of combining or grouping sets of images into a single image, a single mention or use (e.g., a reference, a retrieval, a rendering operation, etc.) can incur only a single unit of overhead when accessing the combined or grouped sets of images. One particular form of grouping involves generation of sprites. In the field of computer graphics, a sprite is a single (larger) image formed by tiling multiple (smaller) images. In one form, a sprite, more specifically a two-dimensional tiling of related images, can form a series of images used to render an animation (e.g., an ordered succession of images).

Sprites are used in web design, and in some cases are referenced in HTML style sheets such as in a cascaded style sheet (CSS). Sprites are used in legacy web design as a way to improve access and rendering performance by combining numerous small images or icons into a larger image called a sprite sheet or tile set. Style sheets (e.g., CSS files) can include code, parameters and/or other constructions for selecting which icon to show on a rendered page.

Generating these sprited images, especially sprited images that are to be referenced in a cascaded style sheet, can be quite difficult, however. A naïve approach is to take a collection of original images and merely tile them in a non-overlapping manner so as to construct a new sprited image. A CSS file can contain a declaration of the location of the sprited images as well as a series of declarations (e.g., one declaration per original image) that describe the size and position of each image within the sprited image. Such declarations, for example, can be used to refer to the upper left corner of a series of rectangular address ranges (e.g., pixel addresses), which in turn can be used to render an animation formed by presenting a series of original images in an ordered succession.

Such a legacy approach suffers from a number of inefficiencies and other problems to be solved. For example: (1) even if a web page does not use one or more of the images, they are still included as part of the sprited image, thus making the size of the sprited image larger and increasing network resource consumption incurred by loading and processing the page; (2) in order to use the produced web page style sheet (e.g., including rules), modifications to the web page itself are often needed; (3) in some cases, the CSS generated by legacy approaches cannot be easily combined with other CSS declarations on the page (e.g., such as when a web page is to reconcile both non-sprited images as well as sprited images); and (4) legacy approaches fail to address the presentation of images on high-density screens that have a high pixel density (e.g., iPhone or MacBook displays).

What is needed is an approach to the collection, declaration and presentation of sprited images. Indeed, the problem to be solved is rooted in technological limitations of the legacy approaches. Improved techniques, in particular improved application of technology, are needed to address the problem of how to efficiently collect and declare a high density of images when using a web page style sheet in a web page setting. Techniques are needed to improve the application and efficacy of various technologies as compared with the legacy approaches.

SUMMARY

The present disclosure provides improved systems, methods, and computer program products suited to address the aforementioned issues with legacy approaches. More specifically, the present disclosure provides a detailed description of techniques used in systems, methods, and in computer program products for composition and declaration of sprited images in a web page style sheet. The various embodiments address the problem of how to efficiently collect and declare a high density of images when using a web page style sheet in a web page setting. Certain embodiments are directed to technological solutions for recode of a collection of web page style sheets to declare a sprite comprising sized images such that only the images used in the collection of the web page style sheets are present in the sprite declarations, which embodiments advance the technical fields for addressing the problem of how to efficiently collect and declare a high density of images when using a web page style sheet in a web page setting, as well as advancing peripheral technical fields. The disclosed embodiments modify and improve over legacy approaches. In particular, practice of the disclosed techniques reduces use of computer memory, reduces demand for computer processing power, and reduces communication overhead needed for composition and declaration of sprited images in a web page style sheet. Some embodiments disclosed herein use techniques to improve the functioning of multiple systems within the disclosed environments, and some embodiments advance peripheral technical fields as well.

Embodiments commence upon identifying a collection of one or more computer-readable instances of individual web page style sheets, and identifying a corresponding collection of computer-readable objects comprising input images, wherein an individual web page style sheet comprises a reference to at least one of the input images. The collection of one or more computer-readable instances of individual web page style sheets are used to determine a set of images, which images are assembled into a tiled image. Occurrences or referenced uses of the images found in the set of images are modified or replaced such that the statements in the web page style sheets reference the tiled image rather than the input images. One or more modified web page style sheet is output to be used in lieu of the unmodified web page style sheet(s). Unused images are discarded or made obsolete. The modification takes targeting calculations into account such as calculating a maximum resolution of one or more particular used images and/or calculating sizing or positioning based on characteristics of a user device type.

Further details of aspects, objectives and advantages of the disclosure are described below and in the detailed description, drawings and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 1A1 presents an environment having host servers in a host farm where the servers are configurable to implement composition and declaration of sprited images in a web page style sheet.

FIG. 1A2 presents an environment having a client-server image delivery protocol between a host server and a client device.

FIG. 5A presents an operation flow used when composing and declaring sprited images in a cascaded style sheet, according to some embodiments.

FIG. 5B presents a data flow used when composing and declaring sprited images in a cascaded style sheet, according to some embodiments.

FIG. 6A depicts a source CSS file code snippet.

FIG. 6B depicts a rewritten CSS file code snippet used when composing and declaring sprited images in a cascaded style sheet, according to some embodiments.

DETAILED DESCRIPTION

Figure 2A:
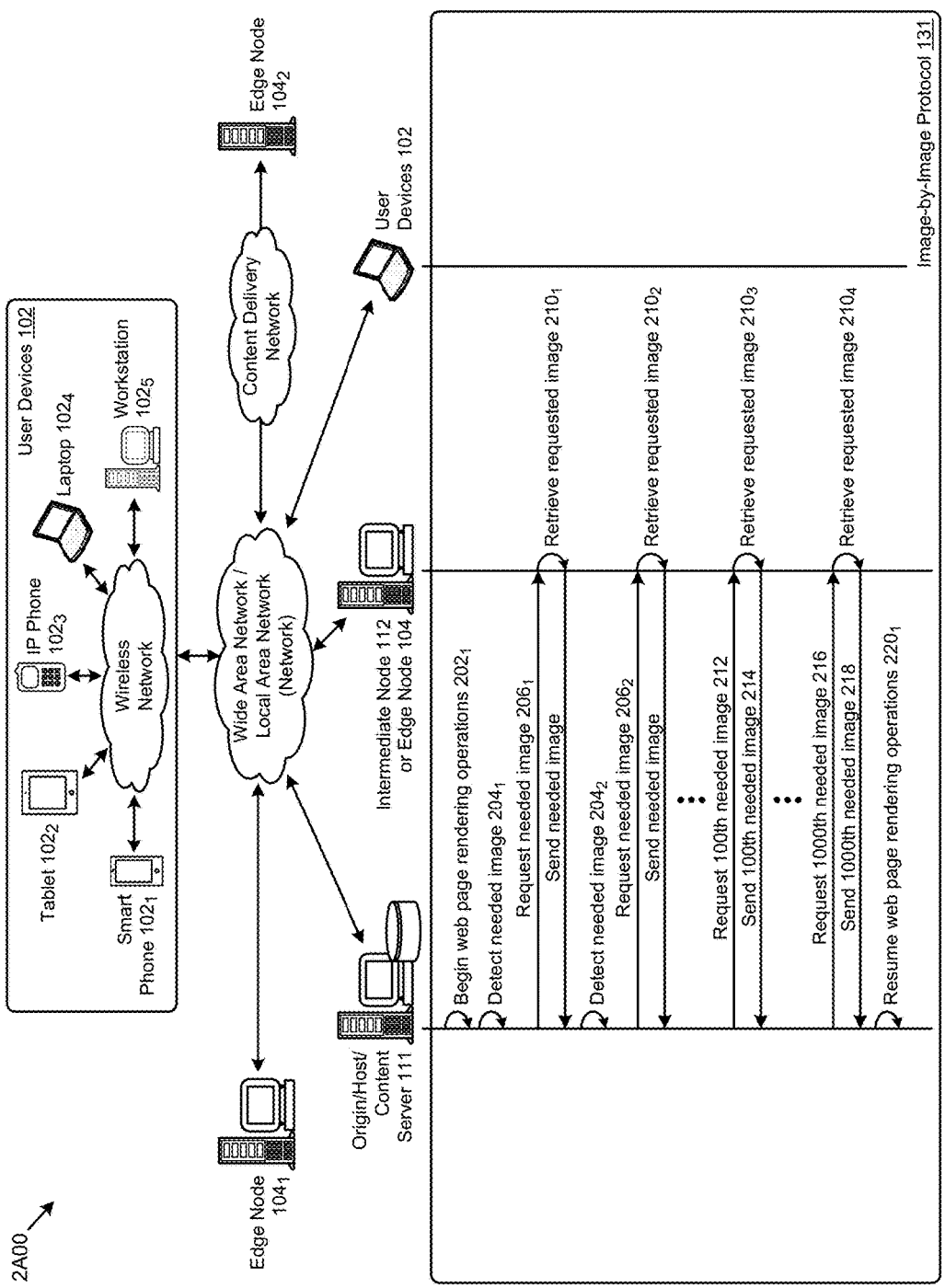
FIG. 2A presents a ladder diagram of an exchange implementing an image-by-image request and response protocol between a host server and a client device.

Some embodiments of the present disclosure address the problem of how to efficiently collect and declare a high density of images when using a cascaded style sheet in a web page setting, and some embodiments are directed to approaches for recode of a collection of web page style sheets to declare a sprite comprising sized images such that only the images used in the collection of the web page style sheets are present in the sprite declarations. More particularly, disclosed herein and in the accompanying figures are exemplary environments, systems, methods, and computer program products for composition and declaration of sprited images in a web page style sheet.

Overview

Sprites are sometime used to implement a method of integrating possibly unrelated images so that they can be sent in one access (e.g., in one group or in one set), then used by a rendering engine to accomplish specialized rendering such as creating an animated character that can be animated on a screen. Such sprites can be created by either electronic circuitry or by software. In web design, HTML code and/or style sheets (e.g., CSS) include references to sprites so as to be used as a way to improve performance by combining numerous small images or icons into a larger image called a sprite sheet or collage, or tile set. During rendering, a referenced sprite is selected and selectively addressed so as to bound (e.g., via origin location, height, and width) a specific tile or icon to show on the rendered page. In exemplary embodiments, CSS can be used to select the parts of the composite image to display at different points in the page. Moreover, HTML markup and style sheets can be authored separately, and a particular sprite can be referenced in many different HTML web pages. A reference to a sprite or tiled image can enhance user-perceived performance when rendering the web page. For example, if a page has ten 1 kB images, the ten 1 kB images can be combined into one 10 kB image, and the one 10 kB image can be downloaded with a single HTTP request. In many cases, reducing the number of HTTP requests can result in a web page loading much faster than if the many images were downloaded image by image using individual image by image HTTP calls. In some cases using CSS sprites can be applied to implement automatic preloading. For example, in situations where an image is not intended to be displayed until some user interaction happens (e.g., a hover state), it is possible to preload such images using CSS sprites.

There are many ways to generate a sprite. Strictly as examples, a sprite can be organized to have the set of tiled images organized by size (e.g., largest first, smallest first, etc.) or by usage (e.g., first referenced in the HTML, second referenced in the HTML, etc.), or grouped by resolution or by type (e.g., GIGs, animated GIFs, JPEGs, etc.). Various techniques to generate sprites, and to declare and reference such generated sprites are discussed hereunder. Further, techniques for separating sprite references from other object references used in an HTML web page are shown and discussed. In particular, various techniques for composition and declaration of sprited images in a cascaded style sheet are shown and described as pertaining to the figures.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 presents an environment 1A100 having host servers in a host farm where the servers are configurable to implement composition and declaration of sprited images in a web page style sheet. As an option, one or more instances of environment 1A100 or any aspect thereof may be implemented in the context of the architecture and functionality of the embodiments described herein. Also, the environment 1A100 or any aspect thereof may be implemented in any desired environment.

As shown, a set of users (e.g., collaborators 118) use various instances or types of user devices 102 (e.g., a smart phone $102_1$, a tablet $102_2$, an IP phone $102_3$, a laptop $102_4$ a workstation $102_5$, etc.) to interact with one or more workspaces (e.g., workspace $122_1$, workspace $122_2$, etc.). The workspaces can be stored in any location, and are at least partially maintained by components within a host farm 101. The host farm 101 supports any variety of processing elements and/or storage devices (e.g., a storage filer) and/or servers such as a host server 115, a sync server 120, a notification server 150, a collaboration server 152, a content server 154, an origin server 156, etc. In some cases the host farm is implemented in whole or in part by a cloud server platform and/or a cloud storage platform.

A set of collaborators 118 can be comprised of any types or roles of users. For example, and as shown, roles can include a user collaborator 123, an administrator collaborator 124, a creator collaborator 125, etc. Collaborators can invoke uploads 127 and/or downloads 129 to/from the host farm and user devices.

Functions and techniques performed by the host farm 101, the client side components on user devices 102, a sync client on a user device, a sync server 120 and/or other related components are described herein with further details and with reference to several examples.

FIG. 1A2 presents an environment 1A200 having a client-server image delivery protocol between a host server and a client device. As an option, one or more instances of environment 1A200 or any aspect thereof may be implemented in the context of the architecture and functionality of the embodiments described herein. Also, the environment 1A200 or any aspect thereof may be implemented in any desired environment.

The embodiment shown in FIG. 1A2 depicts an image request made by an agent (e.g., browser or app). The image request is satisfied by a response in the form of an image being returned. An image can be any computer-parsable format comprising an image (e.g., GIG, JPEG, AVI, etc.). In some cases, an image request is satisfied by an image being returned where the image returned is a collection or collage of images. In some cases, a collection or collage of images is a collection that is referenced in a style sheet, which in turn is referenced in HTML or other computer-parsable markup language. As one specific example, HTML and cascading style sheets (CSS) can be used together for describing the look and formatting of a web document. A style sheet can be referenced in HTML and/or XHTML, and/or JavaScript, and the language (e.g., syntax and semantics) of the style sheet can be applied to any kind of computer-parsable markup language document, including XML, SVG and XUL.

FIG. 2A presents a ladder diagram of an exchange 2A00 implementing an image-by-image request and response protocol between a host server and a client device. As an option, one or more instances of exchange 2A00 or any aspect thereof may be implemented in the context of the architecture and functionality of the embodiments described herein. Also, the exchange 2A00 or any aspect thereof may be implemented in any desired environment.

The embodiment shown in FIG. 2A is merely one example of an image-by-image protocol 131. The shown portion of the image-by-image protocol 131 commences when a server 111 performs web page rendering operations (see operation $202_1$). The web page rendering might include detections of images to be composited into the web page, and some images might be stored at an intermediate node 112 or at edge nodes 104 (e.g., edge node $104_1$, edge node $104_2$, etc.) such that the browser rendering will detect the need to retrieve an image using a network call (see operation $204_1$). In many cases, more than one image is needed and the server will request needed images one by one (see message $206_1$, message $206_2$, etc.). Further rending of the web page might encounter yet other images (see operation $204_2$), and the server may request the other images (see message 212) and receive the requested image from the repository (see message 214). The operations performed at the repository (see operation $210_1$, operation $210_2$, operation $210_3$, operation $210_4$) might be fast, and incur only a relatively small amount of latency, or the operations performed at the repository might be slow, and incur a relatively large amount of latency. Similarly, the network operation between the server 111 and the repository might be slow, incurring latency. Still more individual images might need to be retrieved from the repository (see message 216 and message 218), which might incur still more latency before web page rendering operations can proceed (see operation $220_1$).

This situation of handling image requests and responses on an image-by-image basis can be addressed by use of sprites. One such use of sprites is depicted in the following FIG. 2B.

Figure 2B:
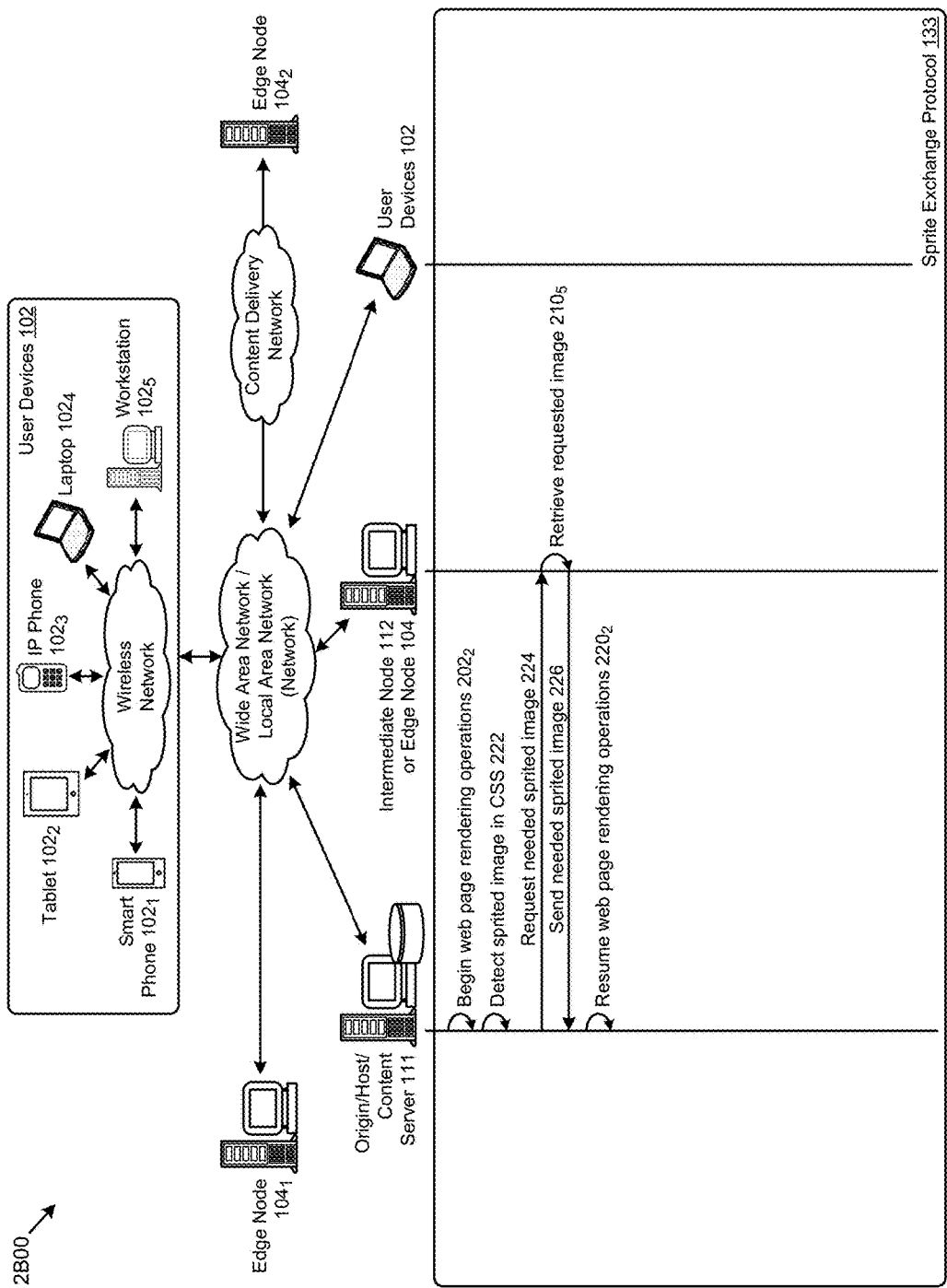
FIG. 2B presents a ladder diagram of an exchange implementing a sprited image request and response protocol between a host server and a client device.

FIG. 2B presents a ladder diagram of an exchange 2B00 implementing a sprited image request and response protocol between a host server and a client device. As an option, one or more instances of exchange 2B00 or any aspect thereof may be implemented in the context of the architecture and functionality of the embodiments described herein. Also, the exchange 2B00 or any aspect thereof may be implemented in any desired environment.

In some settings, a sprited image is formed automatically from a collection of constituent images. Such automation can create a sprited image that contains multiple constituent images, arranged such that they are tiled (e.g., the layed-out constituent images don't overlap). These sprited images are used by web pages in order to reduce the number of network requests for images. In some cases a single sprited image can be cropped to show a sub-range and/or sub-image that is needed for web page rendering, resulting in a single relatively larger network request for the sprited image instead of many relatively smaller image requests. This decreases page load times when loading content over HTTP.

As shown, the web page rendering operations $202_2$ commence with the sprite exchange protocol 133. The rendering detects a sprited image (see operation 222) and requests the sprited image (see message 224), which is retrieved by the intermediate node or edge node (see operation $210_5$). The retrieved sprited image is sent to the requestor (see message 226) and web page rendering continues (see operation $220_2$). This exchange incurs only one unit of protocol overhead in order to retrieve as many images as are included in the sprited collection. A sprited collection can be constructed such that no image in the collection of images overlaps any other image in the sprite. One possible example, a tiled example, is shown and described as pertains to FIG. 3A and FIG. 3B.

Figures 3A, 3B:
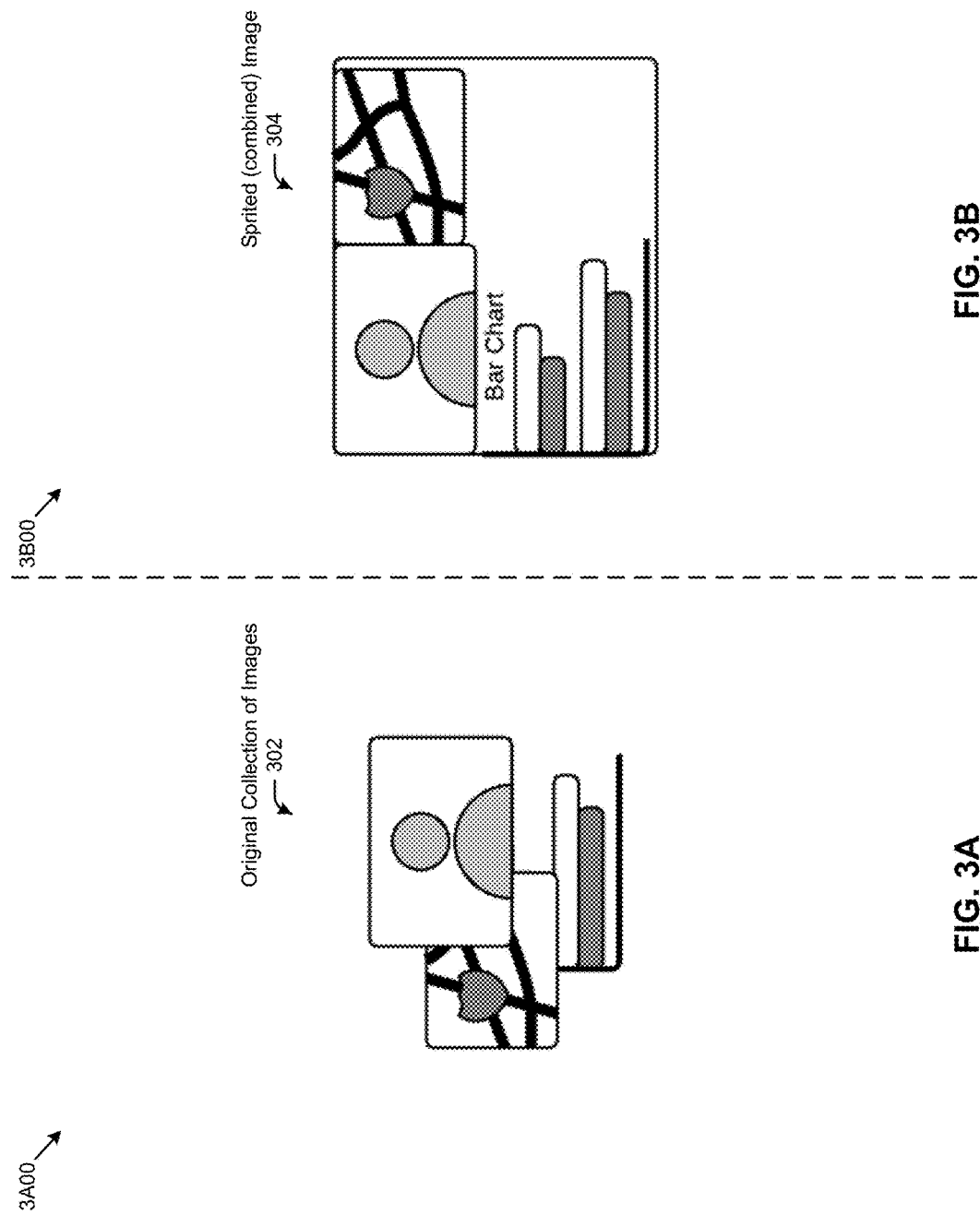
FIG. 3A and FIG. 3B show comparison views of an original collection of images and a sprited (combined) image of the same collection, according to some embodiments.

FIG. 3A and FIG. 3B show comparison views depicted as first comparison view 3A00 and second comparison view 3B00, respectively, of an original collection of images and a sprited (combined) image of the same collection.

The depiction of FIG. 3A shows an original collection of images 302 in no particular order or organization. In contrast, the depiction of FIG. 3B shows a sprited (combined) image 304 that is organized such that no image in the tiled sprite overlaps any other image in the tiled sprite.

Figure 4A:
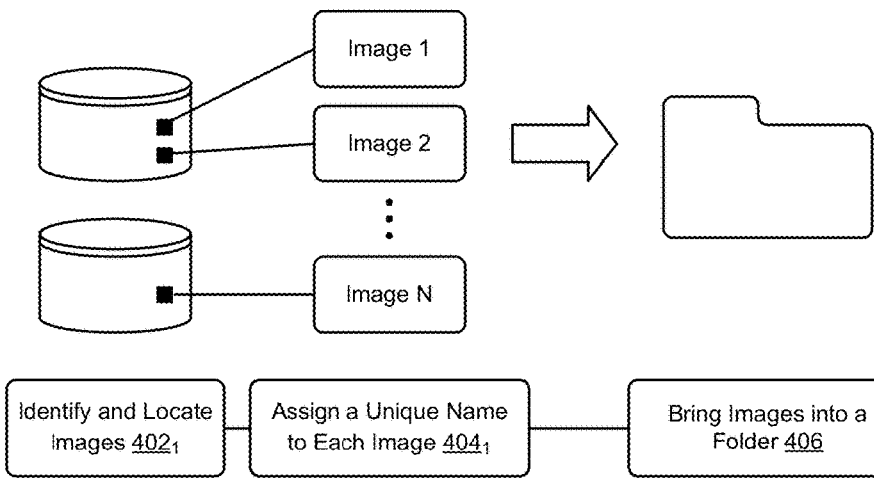
FIG. 4A depicts an HTML web page image set development flow, according to some embodiments.

FIG. 4A depicts an HTML web page image set development flow 4A00.

The embodiment of FIG. 4A is merely one example of a flow where a web page developer organizes images into a folder. As shown, a designer locates images to be rendered in a web page (see operation $402_1$), assigns or ensures each file or object has a unique name (see operation $404_1$), and then brings the images into a single folder (see operation 406). Such a technique to organize images into a single folder is used frequently by web designers, and this fact offers conveniences that are discussed hereunder.

Figure 4B:
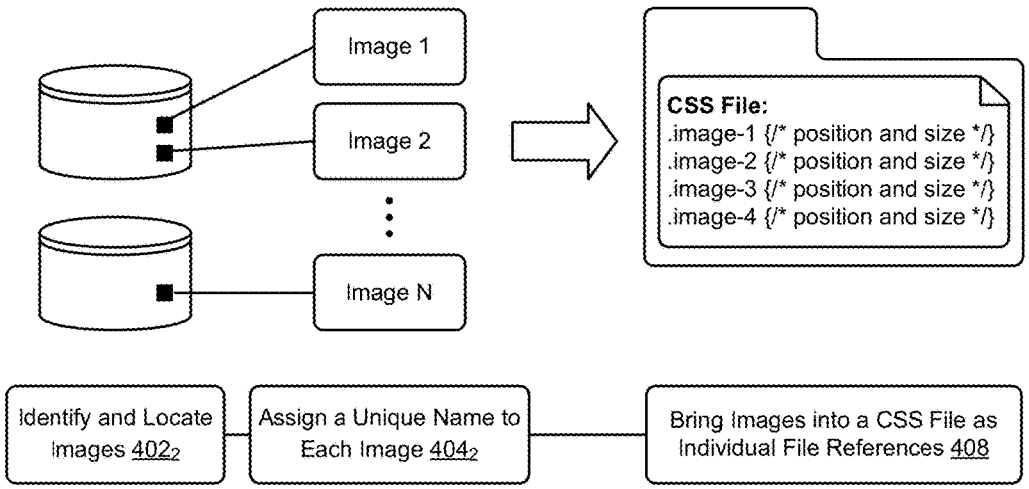
FIG. 4B depicts a cascaded style sheet (CSS) image set development flow, according to some embodiments.

FIG. 4B depicts a cascaded style sheet (CSS) image set development flow 4B00. As an option, one or more instances of cascaded style sheet (CSS) image set development flow 4B00 or any aspect thereof may be implemented in the context of the architecture and functionality of the embodiments described herein. Also, the cascaded style sheet (CSS) image set development flow 4B00 or any aspect thereof may be implemented in any desired environment.

The embodiment of FIG. 4B is merely one example of a flow where a web page developer organizes CSS files into a folder. As shown, a designer locates images to be rendered in a web page (see operation $402_2$), assigns or ensures each file or object has a unique name (see operation $404_2$), and then brings the images into a CSS file as individual references (see operation 408).

FIG. 5A presents an operation flow 5A00 used when composing and declaring sprited images in a cascaded style sheet. As an option, one or more instances of operation flow 5A00 or any aspect thereof may be implemented in the context of the architecture and functionality of the embodiments described herein. Also, the operation flow 5A00 or any aspect thereof may be implemented in any desired environment.

The embodiments discussed advance the art in many ways. Rather than taking only a directory of images and producing both a sprited image and a CSS file, embodiments disclosed herein access a folder or directory of images as well as a folder or directory of CSS files. In the flow of FIG. 5A, the CSS files that are provided as input are overwritten, that is, the file names for respective input CSS files correspond to respective output CSS files having the same file names.

As shown, a given folder comprising CSS files is scanned for constituent CSS files, which are in turn scanned for references to images. The images detected during the scan are loaded from the image directory and decoded into memory. Only the images that the set of CSS files actually have references to are added to the sprited image. Unused images are not included in the sprited image. These operations serve to eliminate unused images from network traffic, resulting in reduced network use during web page rendering.

The operation flow 5A00 depicts a flow that a designer might follow. Various tools can be used to facilitate progression through the operations flow. The shown flow results in modified CSS files and a sprited image. The shown operation flow commences when a designer generates CSS files that contain rules (see FIG. 5A), which rules reference images to be included in a web page (see operation 502). The CSS files and the reference images are brought into respective folders or directories (see operation 504). A tool or process or service is invoked to execute over the combination of the CSS folder and the image folder (see operation 506). The processing includes, at least: determining correspondence between an image reference in a CSS rule and a corresponding image, and identifying unused images, such as images that are contained in the image folder but are not referenced in the CSS rules (see operation 508); assembling the referenced images into a sprited image (see operation 510); saving the sprited image (see operation 512); recoding references to images to refer to the saved sprited image (see operation 514); storing the modified images into an output folder (see operation 515); and storing the modified CSS files into an output folder (see operation 516).

The embodiment shown in FIG. 5A is merely one example, and other operations flows and use of tools or processes or services is possible. In accordance with the shown operation flow 5A00, files in the input image folder are modified and files in the input CSS folder are modified. Strictly as an example, the image folder is modified at least to the extent that the modified image folder contains the sprited image. It is also possible that images found in the input set are processed (e.g., up-sampled, down-sampled, grey-scaled, etc.) before saving in a modified form into the modified image folder. As one example, one embodiment processes images found in the input set such that the maximum required resolution of an image is calculated, and then the image is sprited using the resulting calculated resolution. This provides compatibility with a wide variety of supported user device types. Supported user device types can comprise a laptop device $102_4$ (e.g., with a high resolution display), workstation device $102_5$ (e.g., with a very high resolution display), an IP phone device $102_3$, (e.g., with a smaller, lower-resolution display), and/or other supported user devices. Supported device types may possess characteristics (e.g., of a screen and/or of a graphics processor, and/or of a graphics memory area, etc.). As such, the maximum resolution of one or more particular used images can be calculated based on characteristics of a user device type.

FIG. 5B presents a data flow 5B00 used when composing and declaring sprited images in a cascaded style sheet. As an option, one or more instances of data flow 5B00 or any aspect thereof may be implemented in the context of the architecture and functionality of the embodiments described herein. Also, the data flow 5B00 or any aspect thereof may be implemented in any desired environment.

The data flow 5B00 takes inputs in the form of input folders (e.g., an input image folder 526 and an input CSS folder 528) and produces output folders (e.g., output image folder 546 and output CSS folder 548. In the flow of FIG. 5B, the CSS files that are provided as input are overwritten, that is, the file names for respective input CSS files (e.g., input CSS file 532, input CSS file 534, etc.) correspond to respective output CSS files (e.g., CSS file 536, CSS file 538, etc.) having the same file names. The results of processing over the input folders to generate the output folders are shown in the example data flow.

In the example shown, the input image folder 526 comprises image1 $518_1$, image2 522, image3 520, and image4 $524_1$. Processing 533 commences over the input to generate the output image folder 546 and the output CSS folder 548. The processing further includes recoding of CSS rules. For example, and as shown, an input CSS rule might refer to an image file (e.g., image1) and its size information, whereas the recoded CSS references the sprited image and the position and size of the image within the generated sprited image 530 (e.g., see rule for image1 $518_2$ in CSS file 536 and see rule for image4 $524_2$ in CSS file 538).

As shown, any images that are not referenced by the CSS are not included in the sprited image, though they may be retained in the output image folder. Not including the unused images in the sprited image prevents unused images from consuming bandwidth when responding to image requests (e.g., see message 226 of FIG. 2B). Also as shown, the input CSS is rewritten, removing the need for a web page to link an element to both the existing CSS as well as a new sprited CSS file. This reduces the burden placed on developers when developing web pages. The image references that are present in the recoded CSS can include information such as size and/or resolution and/or other image-related information. Using such image-related information upstream, processes can calculate pixel density (e.g., the ratio of destination size in the sprited image to the source size in the original image) and generate a sprited image that supports high-density displays.

The CSS rules shown and discussed as pertaining to FIG. 5B are merely simplified examples. Recoding techniques embodied in processing 533 can include recoding that addresses compatibility issues. In particular, recoding techniques embodied in processing 533 can apply enforcements or rules such as low resolution rules (e.g., lower-resolution rules) and/or high resolution rules (e.g., higher-resolution rules).

FIG. 6A depicts a source CSS file code snippet 6A00. As an option, one or more instances of source CSS file code snippet 6A00 or any aspect thereof may be implemented in the context of the architecture and functionality of the embodiments described herein. Also, the source CSS file code snippet 6A00 or any aspect thereof may be implemented in any desired environment.

The shown source CSS file code snippet 6A00 includes a sprited image to be recoded. Processing 533 takes as input a CSS file in the CSS folder, and recodes it in accordance with processing rules. For example, processing 533 might be invoked so as to provide upward compatibility for a still-higher density display. Processing 533 might take an input CSS file (e.g., the file comprising the source CSS file code snippet 6A00) and produce an output CSS file (e.g., a rewritten CSS file). One possible form of such a rewritten CSS file is discussed hereunder.

FIG. 6B depicts a rewritten CSS file code snippet 6B00 used when composing and declaring sprited images in a cascaded style sheet. As an option, one or more instances of rewritten CSS file code snippet 6B00 or any aspect thereof may be implemented in the context of the architecture and functionality of the embodiments described herein. Also, the rewritten CSS file code snippet 6B00 or any aspect thereof may be implemented in any desired environment.

As shown, the processing 533 recodes the input CSS by adding in code statement 602 and code statement 604. The addition of these code statements during the recoding process serves to provide compatibility across multiple devices and platforms. Strictly as one compatibility scenario, one browser (e.g., an older browser version) might encounter an instance of code statement 602, and process it, thus the function to provide backward compatibility is satisfied. The same browser might then encounter an instance of code statement 604, however, being an older browser, it might not have instructions to translate the syntax of code statement 604 into semantics or into other operations, so the code statement 604 is ignored. In the case of a different browser (e.g., a newer browser version), when the rewritten CSS file code is encountered the browser overlays or cascades the semantics of code statement 604 over the semantics of code statement 602. As such, the semantics of code statement 604 has precedence over the semantics of code statement 602. The rewritten CSS file code snippet 6B00 is merely an example.

The processing 533 can be applied to an input image folder 526 and an input CSS folder 528 as inputs to produce output image folder 546 and output CSS folder 548. The output CSS folder 548 would contain an instance of a first recoded portion 606. Subsequent application of processing 533 can be applied to output image folder 546 and output CSS folder 548. In such a case, the second application of processing 533 (e.g., using output CSS folder 548 as an input folder) recodes the input CSS by adding in a second code statement 610 and a second code statement 612 to produce an instance of a second recoded portion 608. The previously added recoded portion becomes unnecessary in view of the instance of a second recoded portion 608, so the first recoded portion 606 can be removed in a subsequent pass.

Figure 7A:
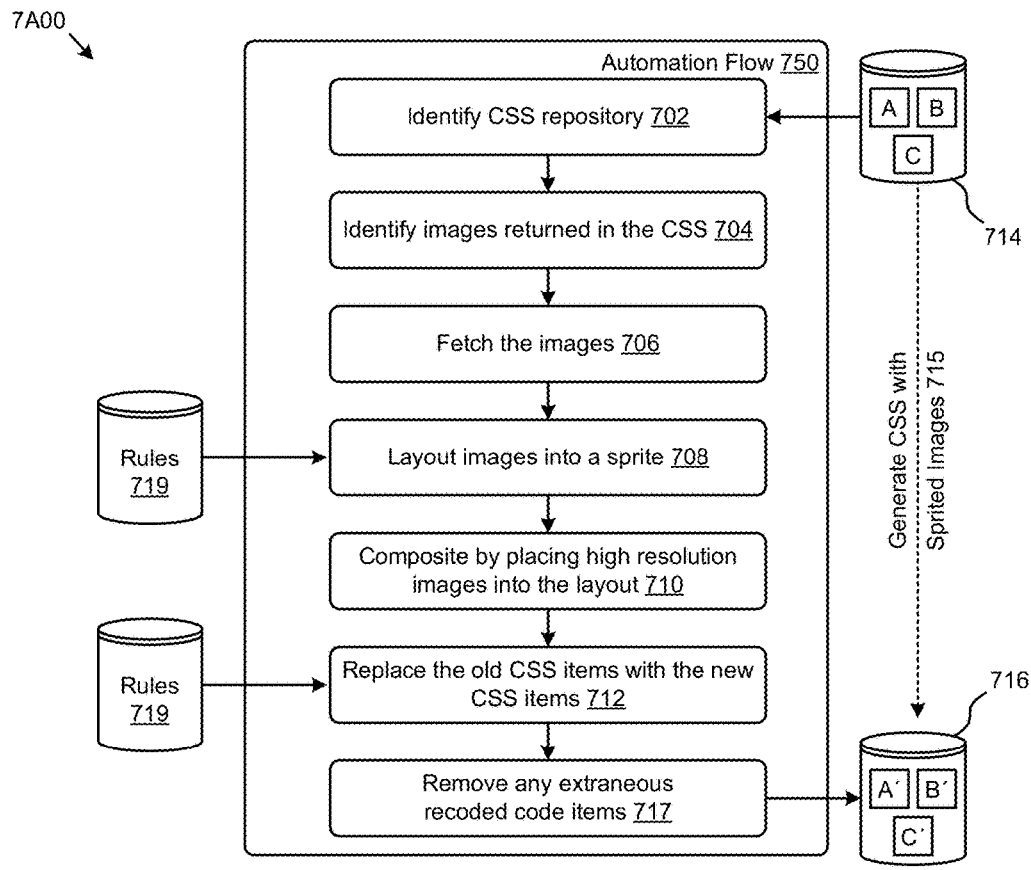
FIG. 7A depicts a portion of an automation flow chart used during development of systems that use sprites for composing and declaring images in a cascaded style sheet.

FIG. 7A depicts a portion of an automation flow chart 7A00 used during development of systems that use sprites for composing and declaring images in a cascaded style sheet. As an option, one or more instances of automation flow chart 7A00 or any aspect thereof may be implemented in the context of the architecture and functionality of the embodiments described herein. Also, the automation flow chart 7A00 or any aspect thereof may be implemented in any desired environment.

It can be inconvenient for developers to be required to regenerate a sprite sheet whenever a new image is added to a project. Depending on the method used to generate and manage sprite sheets, the inconvenience can range from a minor annoyance to a significant decrease in productivity. Automation of certain tasks can reduce reliance on manual efforts.

For example, processing within automation flow 750 can be used to regenerate a sprite sheet. As shown, an input set 714 (e.g., comprising sprited images A, B and C) is taken in as input to the automation flow, which generates an output set 716 comprising sprited images A', B' and C' (see transformation 715).

The shown automation flow chart 7A00 commences upon identification of a CSS repository (see operation 702) and, from that repository, images are identified (see operation 704). The identified images are fetched (see operation 706) and assembled into a sprited image (see operation 708). Strictly as an example, the sprited images can be augmented by placing high resolution images into the sprited layout (see operation 710). In exemplary cases, all available high resolution images are tiled into the sprited layout. In other cases, the actually-used images are tiled into the sprited layout at one or more resolutions as may be needed to support a range of supported user devices.

Changes made to the inputs (e.g., changes made to sprited images, changes made to image locations, etc.) are reflected in the output set (see operation 712). In some cases, the sprited images can comprise both low-resolution images as well as high resolution images, and a selection of high-res or lo-res images for rendering can be made based on the target device and/or agent or browser characteristics.

As earlier discussed a second application of processing 533 (see FIG. 5B) recodes the input CSS by adding in a second code statement 610 and a second code statement 612 to produce an instance of a second recoded portion 608; however, it happens that any previously added recoded portions becomes unnecessary in view of the appearance of the second recoded portion 608, so the first recoded portion 606 can be removed (see operation 717). Such a removal can be accomplished within automation flow 750 at any step, including as a step to remove any extraneous recoded code items just prior to generation of the output set 716.

In some cases, fewer than all of the foregoing steps or operations need to be performed. For example, one flow commences upon identifying a collection of input images (e.g., in a folder) and identifying a collection of individual cascaded style sheets, then using the collection of individual cascaded style sheets and the collection of input images to determine a set of the actually referenced or used images. When the actually referenced or used images are determined, then they are assembled into the actually used images of a sprited or tiled image or images. The affected ones from among the collection of individual cascaded style sheets are modified to generate modified cascaded style sheets that reference the tiled image or images rather than the input images.

Recoding techniques embodied in processing 533 can include recoding that addresses compatibility issues. In particular, recoding techniques embodied in processing 533 can apply enforcements or rules 719 such as a lower-resolution compatibility rule and/or a higher-resolution compatibility rule.

Figure 7B:
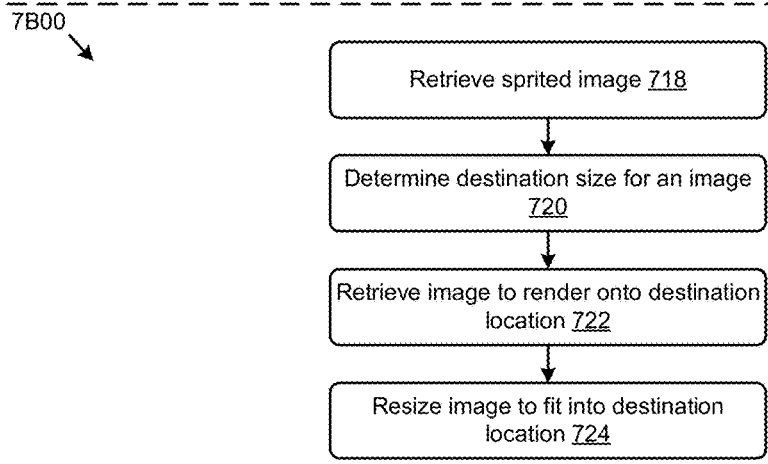
FIG. 7B depicts a portion of an image rendering flow used during development of systems that use sprites for composing and declaring images in a cascaded style sheet.

FIG. 7B depicts a portion of an image rendering flow 7B00 used during development of systems that use sprites for composing and declaring images in a cascaded style sheet. As an option, one or more instances of image rendering flow 7B00 or any aspect thereof may be implemented in the context of the architecture and functionality of the embodiments described herein. Also, the image rendering flow 7B00 or any aspect thereof may be implemented in any desired environment.

The shown flow retrieves a sprited image (see operation 718), then determines a destination size for an image to be rendered. Such a determination can be made on the basis of target device characteristics and/or agent or browser characteristics. In this flow, several compatibility cases are supported: (1) render onto a higher-resolution display using lower-resolution images, (2) include high resolution images (possibly native or possibly upsampled) images in the sprited image and display the higher-resolution image on the higher-resolution display, and (3) include high resolution images in the sprited image and display the higher-resolution image on the lower-resolution display using downsampling before rendering.

One of the aforementioned cases can be selected which, in turn, determines how a higher-resolution image or a lower-resolution image is to be rendered (see operation 720), then the corresponding image is retrieved (see operation 722) and processed (e.g., resampled, scaled and resized) as needed (see operation 724) for rendering it into the destination location in the rendered web page. Strictly as one example, steps within or around operation 722 and steps within or around operation 724 serve to scale and position the sprited images to show the portion of the sprited image to be rendered.

Due to continuous improvements in image quality and improvement in the display capabilities of target devices, changes can be made to images and corresponding sprites quite frequently. When regenerating a new sprite (e.g., to contain the improved images) the changes made to the sprite (e.g., image location, image size, other image information, etc.) can be few or can be many. Accordingly, in some implementations, a tool or process or service creates a difference file (a "diff") of the changes made between a given input set and a corresponding output set. That difference file identified and/or describes the changes between the original CSS code (e.g., the input cascaded style sheets) and the updated CSS code (e.g., the output modified cascaded style sheets). The changes identified may reflect the changes made to the positioning of images within the sprited image. If images were added, removed, or changed, the positions of the images in the final combined image will be different, and the changes to the CSS code reflect those position updates. If a sprite has a very large number of images, then adding or removing a single image can cause repositioning of many images within the sprite, often leading to a very large set of diff occurrences. One approach involves maintaining a file that describes the initial position of every image within a sprited image. When a change is made to the image corpus, or when a change to the instructions to perform recoding results in updates to the position of the images, the initial position file is used to calculate a new set of positions for the images in order to minimize the number of position updates that take place. By doing this, the resulting diff is minimized, making the change set smaller and reducing processing time required to accept the change.

Additional Embodiments of the Disclosure

Additional Practical Application Examples

Figure 8A:
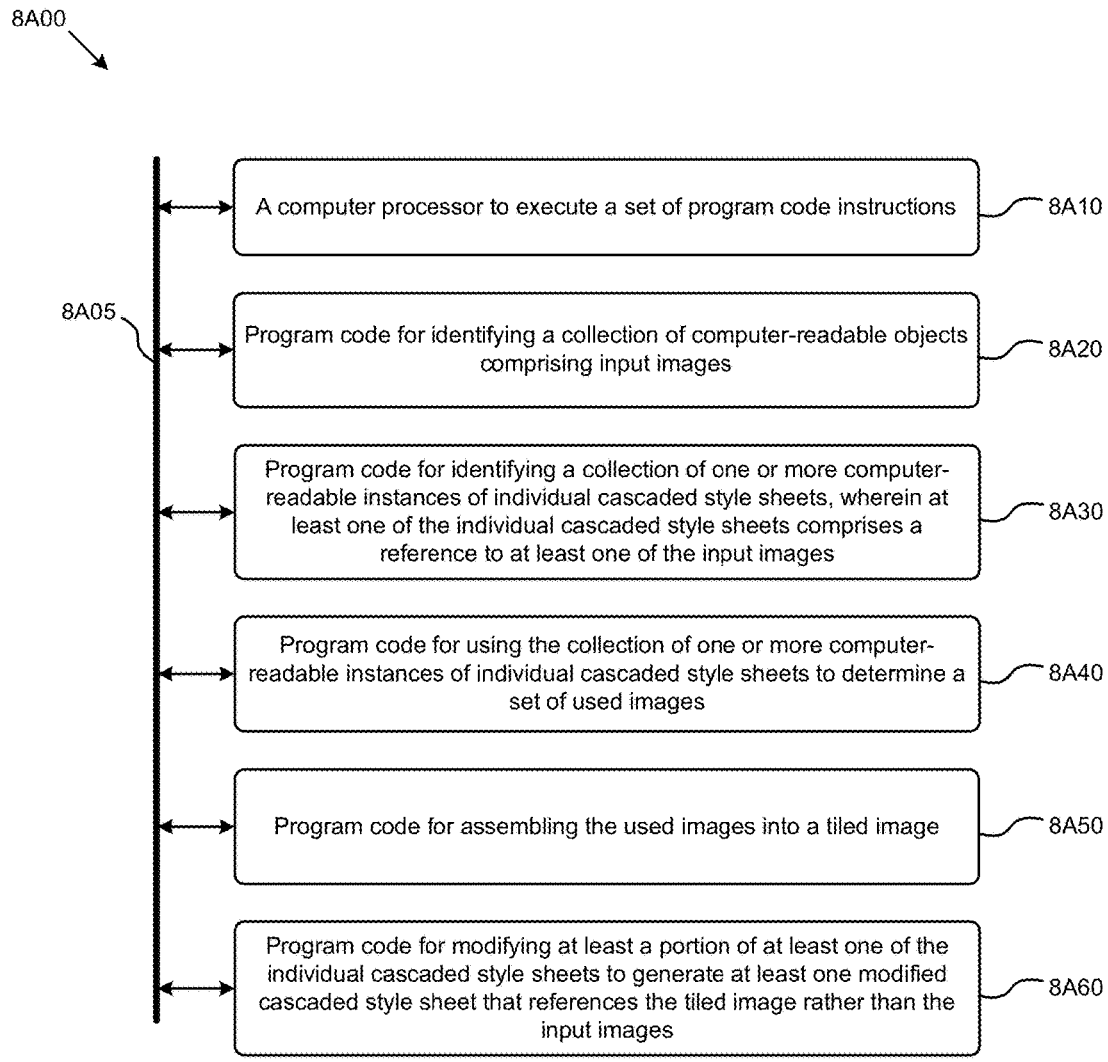
FIG. 8A and FIG. 8B depict systems as arrangements of computing modules that are interconnected so as to operate cooperatively to implement certain of the herein-disclosed embodiments.

FIG. 8A depicts a system 8A00 as an arrangement of computing modules that are interconnected so as to operate cooperatively to implement certain of the herein-disclosed embodiments. The partitioning of system 8A00 is merely illustrative and other partitions are possible. As an option, the system 8A00 may be implemented in the context of the architecture and functionality of the embodiments described herein. Of course, however, the system 8A00 or any operation therein may be carried out in any desired environment.

The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with other operations over communication path 8A05. The modules of the system can, individually or in combination, perform method operations within system 8A00. Any operations performed within system 8A00 may be performed in any order unless as may be specified in the claims.

The shown embodiment implements a portion of a computer system, presented as system 8A00, comprising a computer processor to execute a set of program code instructions (see module 8A10) and modules for accessing memory to hold program code instructions to perform: identifying a collection of computer-readable objects comprising input images (see module 8A20); identifying a collection of one or more computer-readable instances of individual cascaded style sheets, wherein at least one of the individual cascaded style sheets comprises a reference to at least one of the input images (see module 8A30); using the collection of one or more computer-readable instances of individual cascaded style sheets to determine a set of used images (see module 8A40); assembling the used images into a tiled image (see module 8A50); and modifying at least a portion of at least one of the individual cascaded style sheets to generate at least one modified cascaded style sheet that references the tiled image rather than the input images (see module 8A60).

Figure 8B:
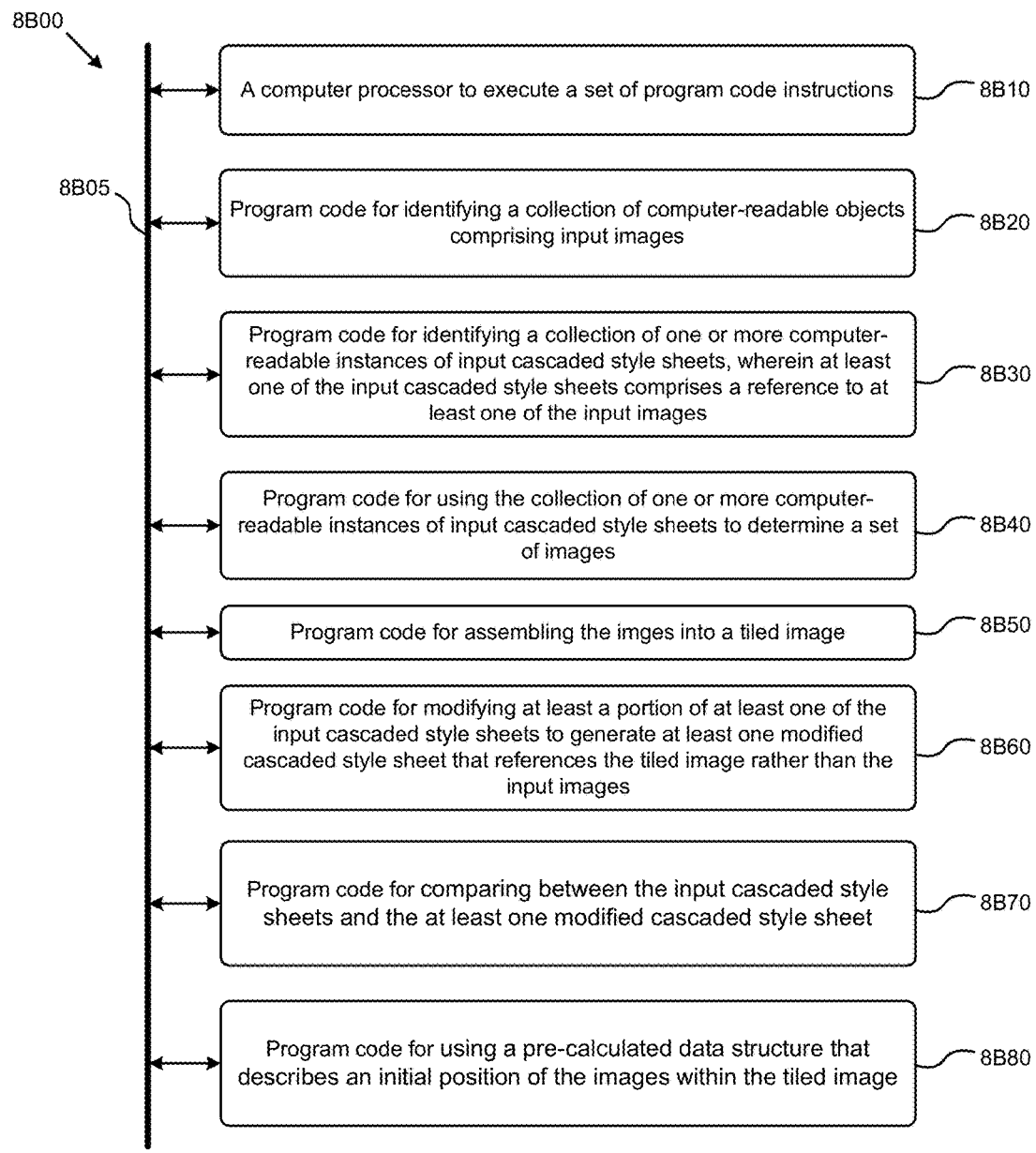

FIG. 8B depicts a block diagram of a system to perform certain functions of a computer system. As an option, the present system 8B00 may be implemented in the context of the architecture and functionality of the embodiments described herein. Of course, however, the system 8B00 or any operation therein may be carried out in any desired environment. The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising a computer processor to execute a set of program code instructions (see module 8B10) and modules for accessing memory to hold program code instructions to perform: identifying a collection of computer-readable objects comprising input images (see module 8B20); identifying a collection of one or more computer-readable instances of input cascaded style sheets, wherein at least one of the input cascaded style sheets comprises a reference to at least one of the input images (see module 8B30); using the collection of one or more computer-readable instances of input cascaded style sheets to determine a set of images (see module 8B40); assembling the images into a tiled image (see module 8B50); modifying at least a portion of at least one of the input cascaded style sheets to generate at least one modified cascaded style sheet that references the tiled image rather than the input images (see module 8B60); comparing between the input cascaded style sheets and the at least one modified cascaded style sheet (see module 8B70); and using a pre-calculated data structure that describes an initial position of the images within the tiled image (see module 8B80).

System Architecture Overview

Additional System Architecture Examples

Figure 9A:
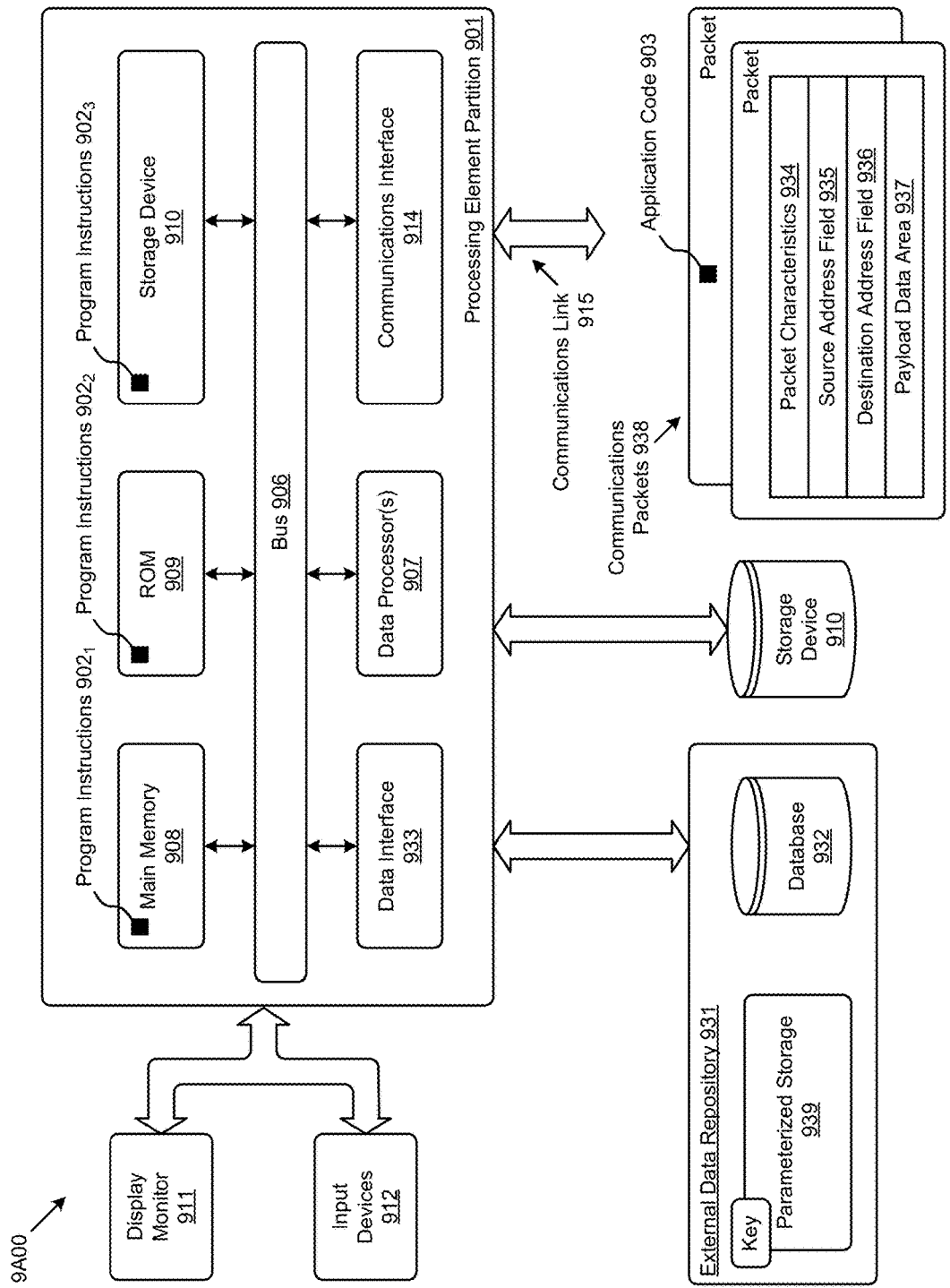
FIG. 9A and FIG. 9B depict exemplary architectures of components suitable for implementing embodiments of the present disclosure and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a CPU, or a multi-core CPU (e.g., having two or more data processors), a system memory (e.g., main memory 908, or an area of random access memory RAM), a non-volatile storage device or area (e.g., ROM 909), an internal or external storage device 910 (e.g., magnetic or optical), a data interface 933, a communications interface 914 (e.g., PHY, MAC, Ethernet interface, modem, etc.). The aforementioned components are shown within processing element partition 901, however other partitions are possible. The shown computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by processor 907 executing one or more sequences of one or more program code instructions contained in a memory. Such instructions (e.g., program instructions $902_1$, program instructions $902_2$, program instructions $902_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 9A00 performs specific networking operations using one or more instances of communications interface 914.

Instances of the communications interface 914 may comprise one or more networking ports that are configurable (e.g., pertaining to speed, protocol, physical layer characteristics, media access characteristics, etc.) and any particular instance of the communications interface 914 or port thereto can be configured differently from any other particular instance. Portions of a communication protocol can be carried out in whole or in part by any instance of the communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as processor 907.

The communications link 915 can be configured to transmit (e.g., send, receive, signal, etc.) communications packets 938 comprising any organization of data items. The data items can comprise a payload data area 937, a destination address 936 (e.g., a destination IP address), a source address 935 (e.g., a source IP address), and can include various encodings or formatting of bit fields to populate the shown packet characteristics 934. In some cases the packet characteristics include a version identifier, a packet or payload length, a traffic class, a flow label, etc. In some cases the payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of storage facility or external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of the computer system 9A00. According to certain embodiments of the disclosure, two or more instances of computer system 9A00 coupled by a communications link 915 (e.g., LAN, PTSN, or wireless network) may perform the sequence of instructions required to practice embodiments of the disclosure using two or more instances of components of computer system 9A00.

The computer system 9A00 may transmit and receive messages such as data and/or instructions organized into a data structure (e.g., communications packets 938). The data structure can include program instructions (e.g., application code 903), communicated through communications link 915 and communications interface 914. Received program code may be executed by processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

The processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 907. Some embodiments include one or more special-purpose hardware components (e.g., power control, logic, sensors, transducers, etc.). A module may include one or more state machines and/or combinational logic used to implement or facilitate performance characteristics during composition and declaration of sprited images in a cascaded style sheet.

Various implementations of the database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of processing steps taken during the composition and declaration of sprited images in a cascaded style sheet). Such files or records can be brought into and/or stored in volatile or non-volatile memory.

Figure 9B:
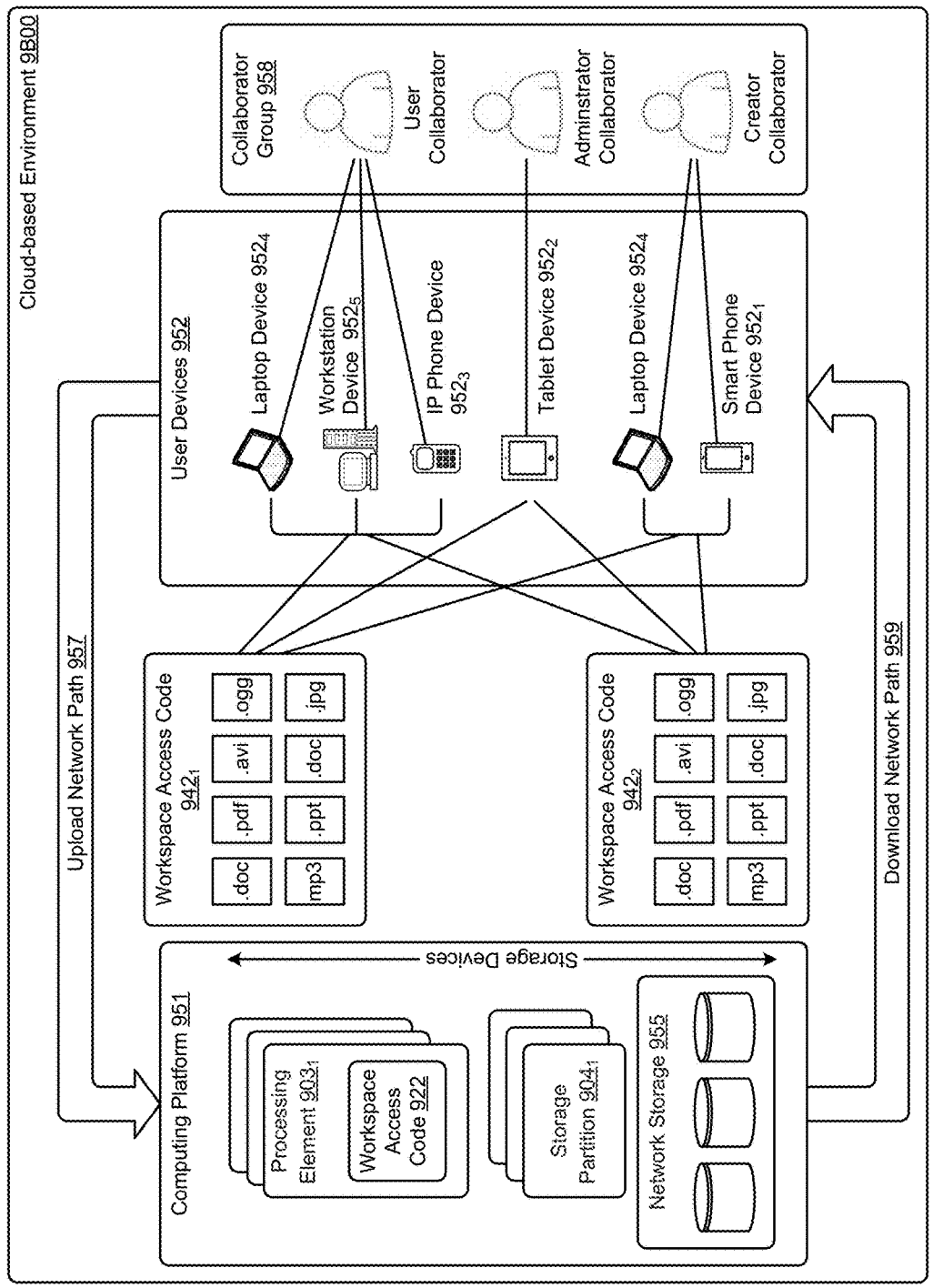

FIG. 9B depicts a block diagram of an instance of a cloud-based environment 9B00. Such a cloud-based environment supports access to workspaces through the execution of workspace access code (e.g., workspace access code 942$_1$ and workspace access code 942$_2$. Workspace access code can be executed on any of the shown user devices (e.g., laptop device 952$_4$, workstation device 952$_5$, IP phone device 952$_3$, tablet device 952$_2$, etc.). A group of users can form a collaborator group 958, and a collaborator group can be comprised of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. Also, a portion of the workspace access code can reside in and be executed on any computing platform, including in a middleware setting. As shown, a portion of the workspace access code resides in and can be executed on one or more processing elements (e.g., processing element $903_1$). The workspace access code can interface with storage devices such the shown networked storage 955. Storage of workspaces and/or any constituent files or objects, and/or any other code or scripts or data can be stored in any one or more storage partitions (e.g., storage partition $904_1$). In some environments, a processing element includes forms of storage, such as RAM and/or ROM and/or FLASH, and/or other forms of volatile and non-volatile storage.

A stored workspace can be populated via an upload (e.g., an upload from a user device to a processing element over an upload network path 957). A stored workspace can be delivered to a particular user and/or shared with other particular users via a download (e.g., a download from a processing element to a user device over a download network path 959).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
    identifying style sheet files that comprise rules referencing images;
        organizing a set of images into an image folder and organizing the style sheet files into a style sheet folder, wherein the images that are referenced in the rules are a subset of the set of images in the image folder;
        identifying unused images, the unused images corresponding to a subset of the set of images in the image folder that are not referenced in the rules in the style sheet files;
        assembling referenced images into a tiled image such that only the referenced images are added to the tiled image and not the unused images; and
        modifying at least a portion of at least one of the style sheet files to generate at least one modified style sheet file that references the tiled image rather than non-tiled images in the set of images in the image folder.

2. The method of claim 1, wherein assembling the images into a tiled image comprises forming a sprite declaration in a cascaded style sheet (CSS).

3. The method of claim 2, wherein a maximum resolution of one or more particular images is calculated based at least in part on one or more characteristics of a user device type.

4. The method of claim 1, further comprising storing at least one modified style sheet to a non-volatile storage area.

5. The method of claim 1, wherein the modified style sheet comprises a first code statement and a second code statement, and wherein the first code statement is a lower resolution compatibility rule and where the second code statement is a higher resolution compatibility rule.

6. The method of claim 1, further comprising removing at least one code statement from the modified style sheet.

7. The method of claim 1, further comprising forming the referenced images into the tiled image.

8. The method of claim 7, further comprising storing the at least one modified style sheet to the style sheet folder.

9. The method of claim 1, further comprising removing the unused images from the set of images, wherein the unused images comprise any of objects that are not referenced in the style sheet files.

10. The method of claim 1, further comprising storing the tiled image to the image folder.

11. A computer program product, embodied in a non-transitory computer readable medium, the computer readable medium having stored thereon a sequence of instructions which, when executed by a processor causes the processor to execute a process, the process comprising:
    identifying style sheet files that comprise rules referencing images;
        organizing a set of images into an image folder and organizing the style sheet files into a style sheet folder, wherein the images that are referenced in the rules are a subset of the set of images in the image folder;
        identifying unused images, the unused images corresponding to a subset of the set of images in the image folder that are not referenced in the rules in the style sheet files;
        assembling referenced images into a tiled image such that only the referenced images are added to the tiled image and not the unused images; and
        modifying at least a portion of at least one of the style sheet files to generate at least one modified style sheet file that references the tiled image rather than non-tiled images in the set of images in the image folder.

12. The computer program product of claim 11, wherein assembling the images into a tiled image comprises forming a sprite declaration in a cascaded style sheet (CSS).

13. The computer program product of claim 12, wherein a maximum resolution of one or more particular images is calculated based at least in part on one or more characteristics of a user device type.

14. The computer program product of claim 11, further comprising instructions for storing at least one modified style sheet to a non-volatile storage area.

15. The computer program product of claim 11, wherein the modified style sheet comprises a first code statement and a second code statement, and wherein the first code statement is a lower resolution compatibility rule and where the second code statement is a higher resolution compatibility rule.

16. The computer program product of claim 11, further comprising instructions for removing at least one code statement from the modified style sheet.

17. The computer program product of claim 11, further comprising forming the referenced images into the tiled image.

18. The computer program product of claim 11, further comprising removing the unused images from the set of images, wherein the unused images comprise any of objects that are not referenced in the style sheet files.

19. A system comprising:
    a storage facility to store a set of images, and to store a collection of one or more computer-readable instances of sheet files; and
    a processor to execute instructions of a process, the process comprising steps for:
        identifying style sheet files that comprise rules referencing the images;

organizing the set of images into an image folder and organizing the style sheet files into a style sheet folder, wherein the images that are referenced in the rules are a subset of the set of images in the image folder;

identifying unused images, the unused images corresponding to a subset of the set of images in the image folder that are not referenced in the rules in the style sheet files;

assembling referenced images into a tiled image such that only the referenced images are added to the tiled image and not the unused images; and modifying at least a portion of at least one of the style sheet files to generate at least one modified style sheet file that references the tiled image rather than non-tiled images in the set of images in the image folder.

20. The system of claim 19, wherein the modified style sheet comprises a first code statement and a second code statement, and wherein the first code statement is a lower resolution compatibility rule and where the second code statement is a higher resolution compatibility rule.

21. The system of claim 19, wherein assembling the images into a tiled image comprises forming a sprite declaration in a cascaded style sheet (CSS).

* * * * *